United States Patent
Oh et al.

(10) Patent No.: US 6,529,490 B1
(45) Date of Patent: Mar. 4, 2003

(54) HANDOVER METHOD BETWEEN MOBILE SWITCHING CENTERS USING INTELLIGENT NETWORK AND IMT-2000 NETWORK SYSTEM ADAPTING THE SAME

(75) Inventors: Se-Jong Oh, Seoul (KR); Shin-Hyun Yang, Seoul (KR); Jae-Hong Park, Seoul (KR)

(73) Assignee: Hyundai Electronics Industries, Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/276,301

(22) Filed: Mar. 25, 1999

(30) Foreign Application Priority Data

Mar. 26, 1998 (KR) ............................................ 98-10547

(51) Int. Cl.$^7$ ................................................ H04Q 7/00
(52) U.S. Cl. ...................... 370/331; 370/360; 370/386
(58) Field of Search ................................ 370/331, 360, 370/386, 329, 338, 401; 455/414, 463, 461, 405; 379/209.01, 58, 60

(56) References Cited

U.S. PATENT DOCUMENTS

| | | | | |
|---|---|---|---|---|
| 5,457,736 A | * | 10/1995 | Cain et al. ..................... | 379/60 |
| 5,629,974 A | * | 5/1997 | Rajata et al. .................. | 379/58 |
| 5,649,978 A | * | 7/1997 | Klem et al. ................... | 455/436 |
| 5,828,661 A | | 10/1998 | Weaver, Jr. et al. | |
| 5,920,820 A | * | 7/1999 | Qureshi et al. .............. | 455/461 |
| 6,044,264 A | * | 3/2000 | Huotari et al. ............... | 455/414 |
| 6,075,855 A | * | 6/2000 | Christiansent et al. . | 379/209.01 |
| 6,078,805 A | * | 6/2000 | Scott ........................... | 455/406 |
| 6,115,600 A | * | 9/2000 | Tuohino et al. .............. | 455/405 |
| 6,137,806 A | * | 10/2000 | Martinez ..................... | 370/428 |
| 6,212,380 B1 | * | 4/2001 | Laatu ......................... | 455/436 |

FOREIGN PATENT DOCUMENTS

| | | | | |
|---|---|---|---|---|
| GB | 2315639 A | * | 2/1998 | ............ H04Q/3/00 |
| WO | WO 97/23110 | | 6/1997 | ............ H04Q/7/38 |
| WO | WO 97/24897 | | 7/1997 | ............ H04Q/7/38 |

* cited by examiner

Primary Examiner—Thanh Cong Le
Assistant Examiner—C. Chow
(74) Attorney, Agent, or Firm—J. Harold Nissen; Myron Greenspan; Lackenbach Siegel, LLP

(57) ABSTRACT

A handover method between mobile switching centers using an intelligent network and an IMT-2000 network system adapting the same are disclosed. The system includes a plurality of RNC each formed of a RACF (Radio Access Control Function) for managing a radio resource and call, an ARF (Access Link Relay Function) for performing an anchor handover between the RNC, and a SACF(Service Access Control Function) for managing and controlling the service, and a plurality of MSC including a SSF(Service Switching Function) for analyzing a service transferred from each of IN and transferring a proper work request to the CCF(Call Control Function) and a CCF for transferring a service request message to the SSF and processing a service request transferred from the SSF for thereby decreasing the consumption of a transfer resource by performing a handover between the MSC using an IN of an IMT-2000 network system.

2 Claims, 5 Drawing Sheets

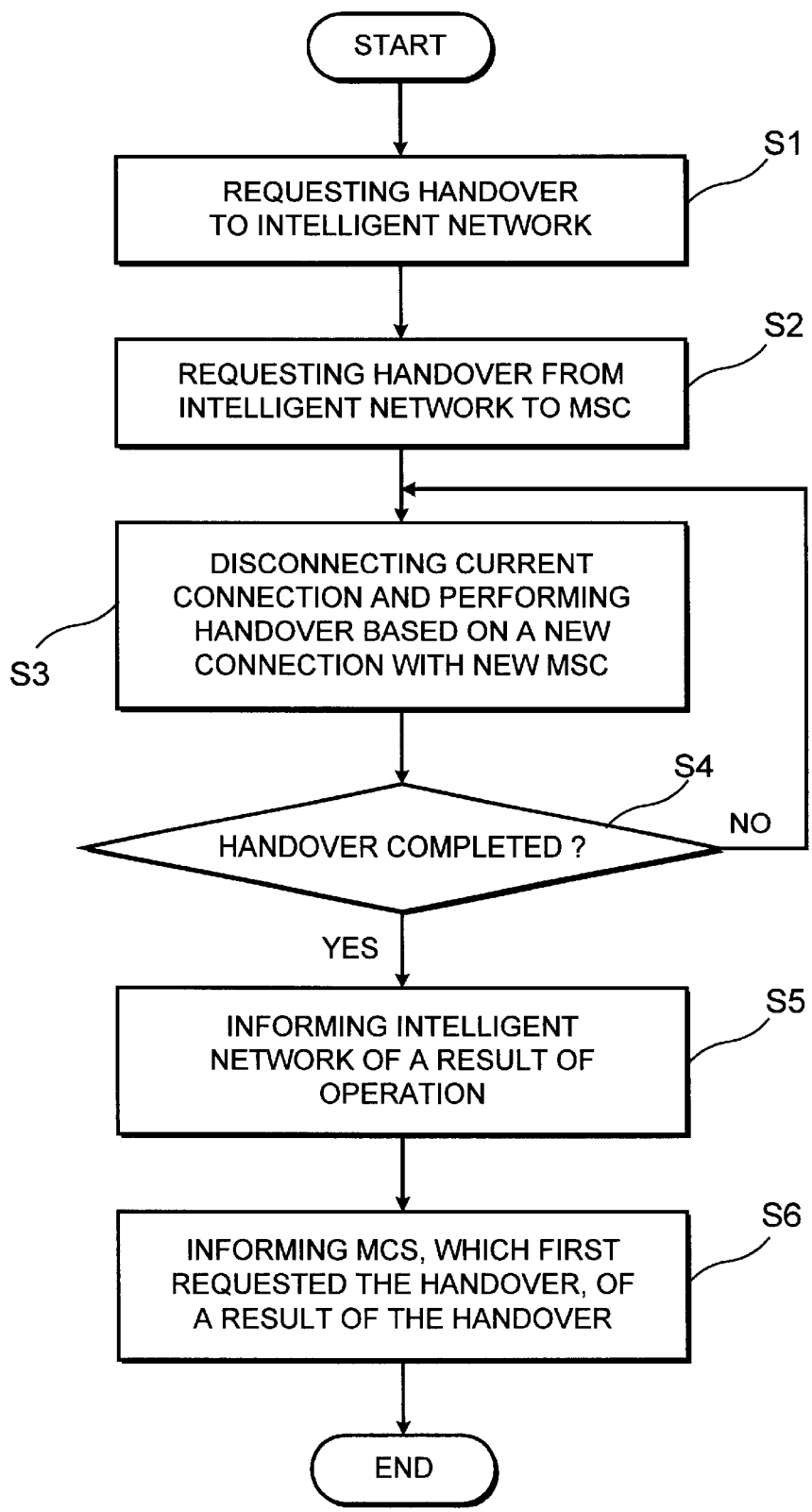
F I G. 4

HANDOVER METHOD BETWEEN MOBILE SWITCHING CENTERS USING INTELLIGENT NETWORK AND IMT-2000 NETWORK SYSTEM ADAPTING THE SAME

BACKGROUND OF THE INVENTION

1. Field of the Invention

The present invention relates to a handover method between mobile switching centers using an intelligent network and an IMT(International Mobile Telecommunication)-2000 network system adapting the same, and in particular, to a handover method between mobile switching centers using an intelligent network and an IMT-2000 network system adapting the same which are capable of effectively managing a link resource for a radio transfer by performing a handover between mobile switching centers for an IMT-2000 network using an intelligent network.

2. Description of the Conventional Art

FIG. 1 is a block diagram illustrating an IMT-2000 network system which is designed for providing a mobile multimedia service of a voice system and a non-voice system using a frequency band.

As shown therein, the conventional IMT-2000 network system includes a radio access network(hereinafter called "RAN") 100 for optimizing a radio environment, a core network(CN) 200 for performing a high speed transfer function and a switching function with respect to the multimedia service, and an intelligent network(IN) 300 for providing various multimedia services. The above-described RAN 100, the CN 200 and the IN 300 are designed to have an independent function for the network and not to affect other networks even when the function and construction of the other networks are changed.

The RAN 100 includes MT (Mobile Terminals) 110 and 111, BTS (Base Terminal Stations) 120 and 121 connected with the MT 110 and 111 for controlling the MT 110 and 111, and RNC(Radio Network Controllers) 130 and 131 for controlling the BTS 120 and 121.

The RNC 130 and 131 perform RACF(Radio Access control Functions) 140 and 150 and ARF(Access Link Relay Functions) 141 and 142. The RACF 140 and 150 perform a function for controlling a radio resource and call, and the ARF 141 and 142 perform an anchor handover between the RNC 130 and 131.

The CN 200 includes MSC 210 and 220 connected with a VLR(Visited Location Register) for registering and managing a subscriber position information and transferring and switching a radio transfer by managing and controlling the RNC 130 and 131 of the RAN 100, and a GMSC (Gateway MSC) 230 connected with the HLR(Home Location Register) or the GLR(Gateway Location Register) for connecting the MSC 210 and 220 to other network.

The MSC 210 and 220 include SSF(Service Switching Functions) 211 and 221 for analyzing a service from the IN 300 as an Asynchronous Transfer Mode (ATM) and transferring a proper work request to the CCF, CCF(Call Control Functions) 212 and 222 for transferring a service request message to the SSF 211 and 221 and processing a service request transferred from the SSF(211 and 221), SACF (Service Access Control Functions) 213 and 223 for managing and controlling a non-call related mobile service, and ARF 214 and 224 for managing a handover between the MSC 210 and 220.

The IN 300 includes a SCP(Service Control Point) 310 having a service control logic, a SDP(Service Data Point) 311 having a data used for performing various services, and an IP(Intelligent Peripheral) having a service resource such as a voice post box.

In the conventional IMT-2000 network system, the handover method between MSC using the anchor method will be explained.

In FIG. 1, two MSC 210 and 220 and the MT 110 and 111 connected thereto are seen, and the RAN 100 may include a plurality of MT, BTS and RNC, and the CN 200 may include a plurality of MSC.

As the MT 110 is moved, if a handover is required from the MSC 210 in which the MT 110 controls the BTS 120 and the RNC 130 to the MSC 220 of the other managing region, the MSC 210 sets a new connection to the MSC 220 of the other managing region via the ARF 214.

Thereafter, in the MSC 220, the handover of the MT 110 is performed via the ARF 224 in accordance with a handover request of the MSC 210 for thereby managing a radio resource and call of the MT 110.

Namely, in order to perform the handover of the MT 110, the MSC 210 should continuously perform the call management and should make a new connection to the MSC 220.

However, in the handover implemented using the anchor method between the MSC, the MSC connected is increased whenever the MT continuously performs the handover, so that the consumption of the link resource between the MSC and the resource of the call processor are increased.

In other words, whenever the handover is performed, the transfer link should be allocated to a new MSC. Therefore, when the MT occupying the channel of a wide band often requests the handover, it is impossible to prevent an over consumption of the transfer resource.

In addition, since the ARF is additionally required for managing the handover for every MSC, the MSC is needed separately from the MSC of a wire-based network for implementing a connection with the radio network. Furthermore, the construction of the MSC is complicated for thereby increasing a fabrication cost.

SUMMARY OF THE INVENTION

Accordingly, it is an object of the present invention to provide a handover method between mobile switching centers using an intelligent network and an IMT-2000 network system adapting the same which overcome the aforementioned problems encountered in the conventional art.

It is another object of the present invention to provide a handover method between mobile switching centers using an intelligent network and an IMT-2000 network system adapting the same which are capable of decreasing the consumption of a transfer resource by performing a handover between the MSC using an IN of an IMT-2000 network system without varying an interface protocol between a MSC and an IN in a CN and decreasing the fabrication cost using an ATM MSC formed of a SSF and CCF for thereby implementing a proper traffic distribution based on a non-hierarchial IMT-2000 network system through the MSC having the same structure in which a gateway MSC is not used.

In order to achieve the above objects, there is provided an IMT-2000 network system adapting a handover method between mobile switching centers using an intelligent method which includes a plurality of RVC each formed of a RACF (Radio Access Control Function) for managing a radio resource and call, an ARF(Access Link Relay Function) for performing an anchor handover between the RNC, and a SACF(Service Access Control Function) for managing and controlling the service, and a plurality of MSC including a SSF(Service Switching Function) for analyzing a service transferred from each of IN and transferring a proper work request to the CCF(Call Control Function) and a CCF for transferring a service request message to the SSF and processing a service request transferred from the SSF wherein the IMT-2000 network system comprises a RAN(Radio Access Network) including a plurality of MT (Mobile Terminal), a plurality of BTS (Base Terminal Station) connected with a plurality of the MT based on a wireless connection for controlling the MT, and a plurality of RNC(Radio Network Controller) for controlling a plurality of the BTS, a CN(Core Network) which is connected with a VLR(Visited Location Register) and HLR/GLR(Home Location Register/Gateway Location Register) and includes a plurality of MSC (Mobile Switching Center) which registers and manages the RNC in the RAN for thereby transferring and exchanging a radio resource and performs a high speed transfer function and exchanging function with respect to a multimedia service, and an IN(Intelligent Network) including a SCP(Service Control Point) provided with a service control logic, a SDP(Service Data Point) provided with a data used for a service, and an IP(Intelligent Peripheral) provided with a service resource for thereby providing various multimedia services.

In order to achieve the above objects, there is provided a handover method between mobile switching centers using an intelligent network which includes the steps of a first step in which the SCP of a corresponding IN requests a handover to the third MSC after the SSF of the first MSC requests a handover of the first MT to the SCP of the IN when the first MT requests a handover to the first MSC of a control region based on the movement of the first MT in the control region of the first MSC, a second step in which the CCF of the third MSC disconnects the connection with the first MSC in accordance with a handover request of the IN in the first step for thereby changing a routing table, setting a new connection with the second MSC and performing a handover between the MSC, and a third step in which the third MSC informs the SCP of the IN of a result of the handover operation when the handover is successfully completed in the second step and the SCP of the IN which receives the information informs the first MSC of a result of the handover wherein the IMT-2000 network system comprises a RAN (Radio Access Network) including first and second MT(Mobile Terminal), first and second BTS(Base Terminal Station) for controlling first and second MT connected with the first and second MT based on a wireless connection for thereby controlling the first and second MT so that a radio environment is optimized, a CN(Core Network) connected with a VLR(Visited Location Register) and a HLR/GLR (Home Location Register/Gateway Location Register) for registering and managing a subscriber position information and including first through third MSC(Mobile Switching Center) for transferring and exchanging a radio resource by managing and controlling the first and second RNC in the RAN for thereby performing a high speed transfer function and exchange function with respect to the multimedia service, and an IN(Intelligent Network) including a SCP (Service Data Point) provided with a service control logic and an IP (Intelligent Peripheral) provided with a SDP (Service Data Point) having a data for performing a service and a service resource for thereby providing various multimedia services.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flow chart illustrating a handover method between mobile switching centers using an intelligent network according to the present invention;

DETAILED DESCRIPTION OF THE INVENTION

The construction of an IMT-2000 network system which implements a handover method between MSC using an IN and a handover method between MSC using the IN according to the present invention will be explained with reference to the accompanying drawings.

Figure 1:
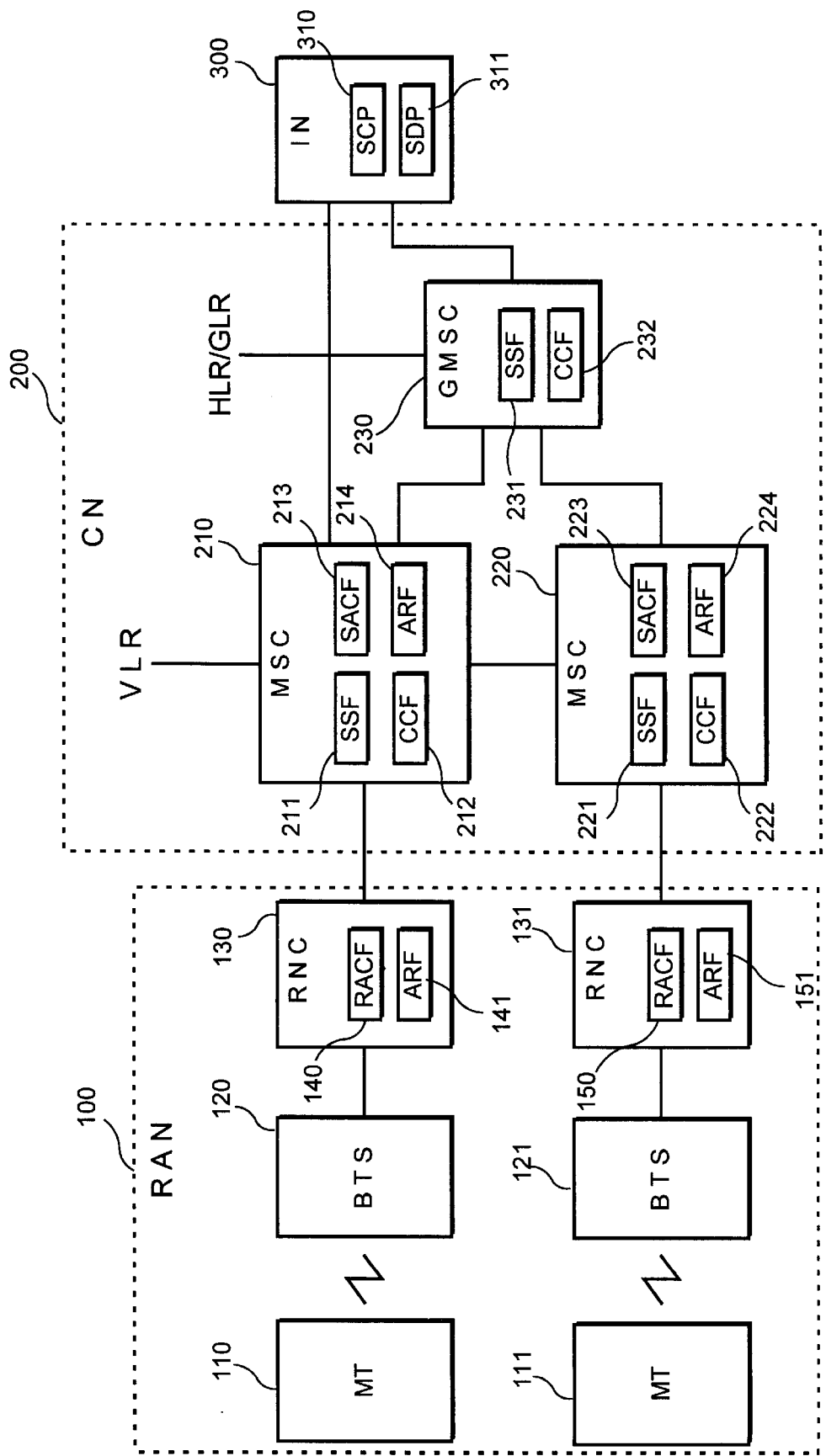
FIG. 1 is a block diagram illustrating a conventional IMT-2000 network system.
Figure 2:
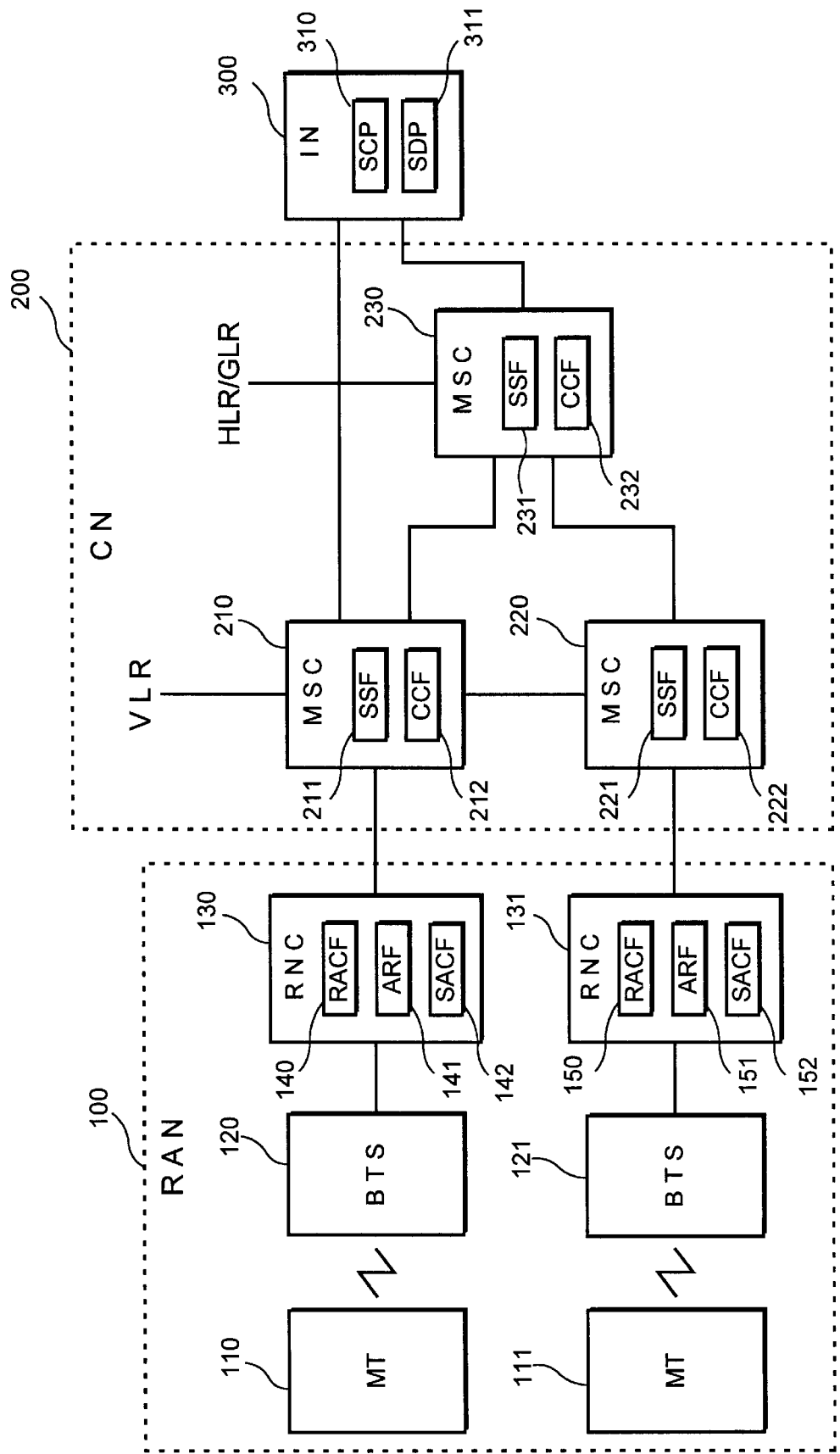
FIG. 2 is a block diagram illustrating an IMT-2000 network system for implementing a handover method between mobile switching centers using an intelligent network according to the present invention.

FIG. 2 illustrates the IMT-2000 network system for implementing a handover method between MSC using an IN according to the present invention.

As shown therein, the IMT-2000 network system for implementing a handover method between the MSC using an IN according to the present invention includes a RAN 100 having MT 110 and 111, BTS 120 and 121 connected with the MT 110 and 111 based on a wireless connection for controlling the MT 110 and 111, and RNC 130 and 131 for controlling the BTS 120 and 121 for thereby optimizing the wireless environment, a CN 200 connected with the VLR and HLR/GLR which register and manage the subscriber position information for transferring and exchanging the radio resource by managing and controlling the RNC 130 and 131 of the RAN 100, and an IN 300 having the SCP 310 formed of a service control logic, a SDP 311 formed of a data used when the service is performed, and an IP formed of a service resource such as a voice main box for thereby providing various multimedia services.

The RAN 130 and 131 includes RACF 140 and 150 for managing a radio resource and call, ARF 141 and 142 for performing an anchor handover between the RNC 130 and 131 and SACF 142 and 152 for managing and controlling the services.

The MSC 210, 220 and 230 of the CN 200 each include SSF 211, 221 and 231 for transferring a proper work request to the CCF, and CCF 212, 222 and 232 for transferring a service request message to the SSF 211, 221 and 231 and processing the service request transferred from the SSF 211, 221 and 231.

The SCP 310 and SDP 311 of the IN 300 perform the SCF(Service Control Function) and the SDF(Service Data Function).

Here, in the present invention, the construction which is the same as the conventional art is given the same reference numerals. In view of the IMT-2000 network system according to the present invention, the construction of the RNC 130 and 131 of the RAN 100 and the structure of the MSC 210 and 220 of the CN 200 are different from the conventional IMT-2000 network system.

Namely, the RNC 130 and 131 of the RAN 100 include the SACF which is used for the conventional MSC. Therefore, in the MSC 210 and 220 of the CN 200, the SACF is not used.

In addition, the MSC 210 and 220 of the CN 200 are formed in the same structure as the GMSC implemented by the SSF and CCF, not by the MSC of the conventional IMT-2000 network system.

In the present invention, the non-hierarchial structure is implemented. Namely, the hierarchial structure which needs the GMSC of the conventional IMT-2000 network system is not used for thereby preventing a traffic concentrated to the GMSC.

Figure 3:
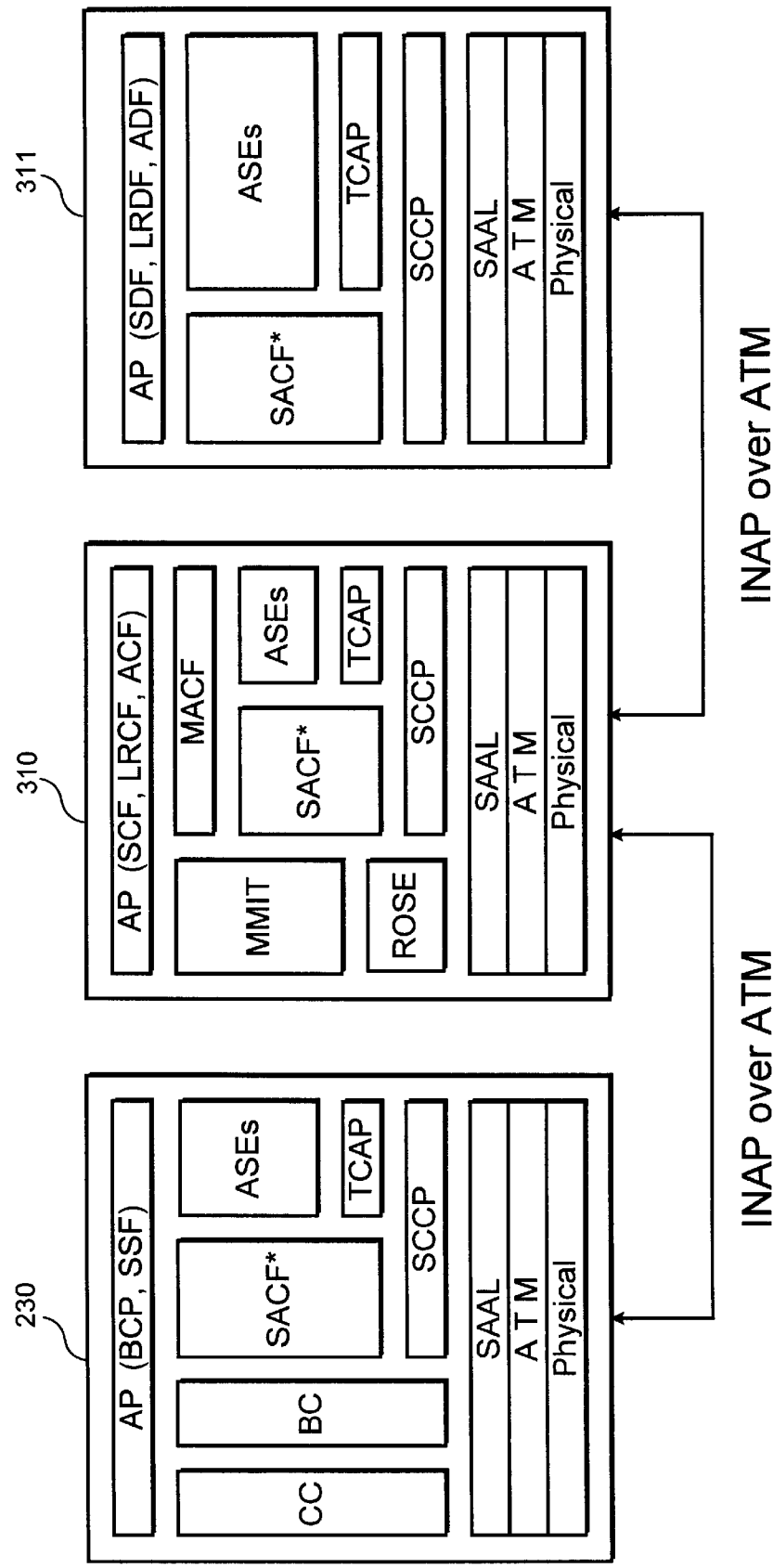
FIG. 3 is a block diagram illustrating a protocol between a mobile switching center and an intelligent network for a transfer network for implementing a handover method between mobile switching centers using an intelligent network according to the present invention.

FIG. 3 illustrates the protocol between the MSC 210, 220 and 230 of the CN 200 and the SCP 310 and the SDP 311 of the IN 300 for implementing the handover method between the MSC using an IN. As shown therein, there is shown a protocol structure between the MSC 230, the SCP 310 and the SDP 311.

The MSC 230 includes an AP(Application Process) formed of a BCP(Base Call Process) and a SSF(Service Switching Function), a CC(Call Control), a BC(Bearer Control), a SACF*(Single Association control Function), an ASEs(Application Service Elements), a TCAP (Transaction Capability Application Process), a SCCP (Signalling Connection Control Part), a SAAL (Signalling ATM Adaptation Layer), an ATM and a physical element.

The SCP 300 includes an AP for performing the SCF (Service control Function, a LRCF(Location Register Control Function), and an ACF(Authentication Control Function), a MM-T(Terminal Mobility Management), a MACF(Multiple Association control Function), a ROSE (REmote Operation Service Element), a SACF*, ASEs, a TACP, a SCCP, a SAAL, an ATM and a physical element.

The SDP 3210 includes an AP which performs a SDF (Service Data Function), a LRDF(Location Register Data Function), an ADF(Authentication Data Function), a SACF*, ASEs, a TCAP, a SCCP, a SAAL, an ATM and a physical element.

The thusly constituted protocol provides the SCP 310 and the SDP 311 with the LRCF(Location Register Control Function) and the LRDF(Location Register Data Function) based on the mobility for the service control of the IN. The remaining construction is the same as the conventional CN protocol structure. The description of the same will be explained.

FIG. 4 illustrates the handover method between the MSC using the IN according to the present invention.

The handover method between the MSC using the IN 300 for the IMT-2000 network system as shown in FIGS. 2 and 3 will be explained with reference to FIG. 4.

Here, the MSC before the handover is assumed as the MSC 210 of FIG. 2 based on the pMSC(Previous MSC), the MSC which is handed over is assumed as the MSC 220 of FIG. 2 based on the cMSC (Candidate MSC), and the transfer MSC is assumed as the MSC 230 of FIG. 2.

In Step S1, if the MT 110 requests the handover to the pMSC 210 of the control area based on the movement of the MT 110 in the control region of the pMSC 210, the SSF 211 of the pMSC 210 requests the handover of the MT 110 to the SCP 310 of the IN 300. Namely, the handover request from the CCF 212 is transferred to the SCP 310 of the IN 300 based on the SSF 211 of the pMSC 210.

Thereafter, the SCP 310 of the IN 300 requests the handover to the transfer MSC 230. Therefore, in Step S3, the CCF 232 of the transfer MSC 230 disconnects the connection with the pMSC 210 and changes the routing table and resets a connection with a new cMSC 220 for thereby performing the handover between the MSC.

Namely, the SCP 310 of the IN 30c transfers a remote instruction to the CCF 232 of the transfer MSC 230 for thereby changing the routing table, and the CCF 232 performs a resetting procedure of the connection based on the BCF(Bearer Control Function)(Not shown).

In Step S34, when the handover of Step S3 is successfully completed, in Step S5, the transfer MSC 230 informs a result of the handover to the SCP 310 of the IN 300, and in Step S6, the SCP 310 of the IN 300 informs the pMSC 210, which first requested the handover, of a result of the handover.

The above-described IN concept is implemented based on the IN CS-3 for thereby distributing the intelligent element to the network, combining the distributed service elements and forming a SIB(Service Independent Block) for thereby performing a remote work in parallel.

Namely, when performing the handover between the MSC using the IN, a plurality of remote works which are needed for the handover between the MSC are implemented in parallel under the management of the SCP of the IN, so that the time delay for implementing a connection resetting procedure is decreased, and it is possible to obtain a uniform management.

Figure 5:
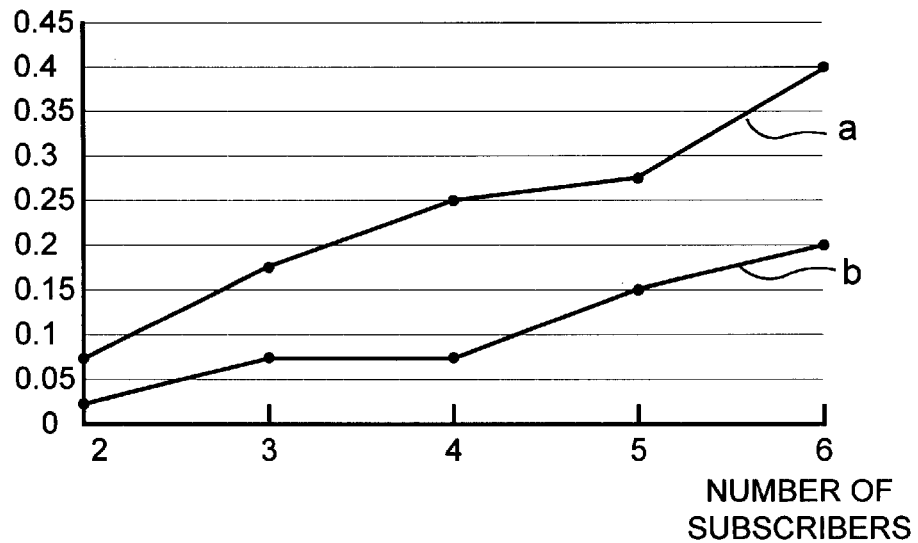
FIG. 5 is a graph illustrating a comparison with respect to a call setting failure ratio between a conventional anchor method and an intelligent network-based method according to the present invention.
Figure 6:
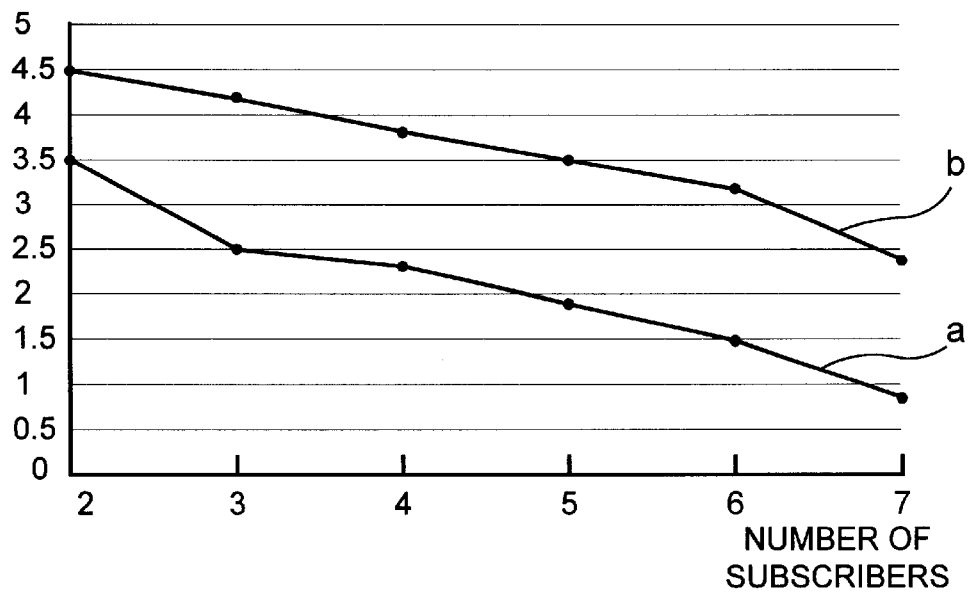
FIG. 6 is a graph illustrating a comparison with respect to the number of usable links between a conventional anchor method and an intelligent network-based method according to the present invention.

FIGS. 5 and 6 illustrate a result of the handover performance between the MSC by collecting the call setting failure ratio and the data with respect to the management capability of the link resource by implementing the IMT-2000 network system using the simulation language.

Namely, as shown in FIG. 5, it is known that the handover "a" between the MSC using the anchor method has a call setting failure ratio two times the ratio of the handover "b" between the MSC using the IN. This means that it is hard for the anchor method in which a new link should be allocated at the time of the handover to set a new call.

Therefore, in the IMT-2000 network system in which the handover is performed between the MSC using the IN according to the present invention, more subscribers may use the IMT-2000 network system.

In addition, as shown in FIG. 6, the IMT-2000 network system "b" which performs the handover between the MSC using the IN has more usable link resource compared to when the IMT-2000 network system "b" performs the handover "a" based on the anchor method.

As described above, in the present invention, it is possible to simplify the construction of the system and to decrease the cost removing the function for performing the handover provided in the MSC of the existing IMT-2000 network system and using the ATM MSC formed of the conventional SSF and CCF. In addition, in the present invention, the gateway MSC is not used, and it is possible to prevent the traffics from being concentrated at the gateway MSC using the conventional anchor method. Furthermore, a desired interface is implemented between the radio connection network in any type of MSC based on the non-hierarchial network structure, and it is possible to achieve a flexible network and a proper traffic distribution.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In an IMT-2000 network system comprising a RAN (Radio Access Network) including a plurality of MT (Mobile Terminal), a plurality of BTS (Base Terminal Station) connected with a plurality of the MT based on a wireless connection for controlling the MT, and a plurality of RNC (Radio Network Controller) for controlling a plurality of the BTS, CN (Core Network) which is connected with a VLR (Visited Location Register) and HLR/GLR (Home Location Register/Gateway Location Register) and includes a plurality of MSC (Mobile Switching Center) which registers and manages the RNC in the RAN for thereby transferring and exchanging a radio resource and performs a high speed transfer function and exchanging function with respect to multimedia service, and an IN (Intelligent Network including a SCP (Service Control Point) provided with a data used for a service, and an IP (Intelligent Peripheral) provided various multimedia services, and improved IMT-2000 network system comprising:

a plurality of RNC each formed of a RACF (Radio Access Control Function) for managing a radio resource and call, an ARF (Access Link Relay Function) for performing an anchor handover between the RNC, and a SACF (Service Access Control Function) for managing and controlling the service;

a first through third MSC including a SSF (Service Switching Function) for analyzing a service transferred from each of IN and transferring a proper work request to the CCF (Call Control Function) and a CCF for transferring a service request message to the SSF and processing a service request transferred from the SSF; and wherein the SCP of a corresponding IN requests a handover to the third MSC includes the SSF of the CN and the SACF for the managing and controlling the services to request a handover of the first MSC of a control region based on the movement of the first MT in the control region of the first MSC.

2. In a method for performing a handover between MSC in an IMT-2000 network system comprising a RAN(Radio Access Network) including first and second MT(Mobile Terminal), first and second BTS(Base Terminal Station) for controlling first and second MT connected with the first and second MT based on a wireless connection for thereby controlling the first and second MT so that a radio environment is optimized, a CN(Core Network) connected with a VLR(Visited Location Register) and a HLR/GLR(Home Location Register/Gateway Location Register) for registering and managing a subscriber position information and including first through third MSC(Mobile Switching Center) for transferring and exchanging a radio resource by managing and controlling the first and second RNC in the RAN for thereby performing a high speed transfer function and exchange function with respect to the multimedia service, and an IN(Intelligent Network) including a SCP (Service Data Point) provided with a service control logic and an IP(Intelligent Peripheral) provided with a SDP (Service Data Point) having a data for performing a service and a service resource for thereby providing various multimedia services, an improved handover method between MSC using an intelligent network comprising the steps of:

a first step in which the SCP of a corresponding IN requests a handover to the third MSC after the SSF of the first MSC requests a handover of the first MT to the SCP of the IN when the first MT requests a handover to the first MSC of a control region based on the movement of the first MT in the control region of the first MSC;

a second step in which the CCF of the third MSC disconnects the connection with the first MSC in accordance with a handover request of the IN in the first step for thereby changing a routing table, setting a new connection with the second MSC and performing a handover between the MSC; and a third step in which the third MSC informs the SCP of the IN of a result of the handover operation when the handover is successfully completed in the second step and the SCP of the IN which receives the information informs the first MSC of a result of the handover.

* * * * *